(12) United States Patent
Price et al.

(10) Patent No.: US 10,712,561 B2
(45) Date of Patent: Jul. 14, 2020

(54) INTERFERENCE MITIGATION VIA ADAPTIVE DEPTH IMAGING

(71) Applicant: Microsoft Technology Licensing, LLC, Redmond, WA (US)

(72) Inventors: Raymond Kirk Price, Redmond, WA (US); Jian Zhao, Kenmore, WA (US); Michael Bleyer, Seattle, WA (US); Denis Demandolx, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 337 days.

(21) Appl. No.: 15/344,093

(22) Filed: Nov. 4, 2016

(65) Prior Publication Data

US 2018/0130209 A1    May 10, 2018

(51) Int. Cl.
*G01S 17/32*    (2020.01)
*G01S 1/00*    (2006.01)
(Continued)

(52) U.S. Cl.
CPC .......... *G02B 27/017* (2013.01); *G01S 7/4876* (2013.01); *G01S 7/497* (2013.01); *G01S 17/10* (2013.01); *G01S 17/88* (2013.01); *G01S 17/89* (2013.01); *G06K 9/00664* (2013.01); *G06K 9/2027* (2013.01); *G06T 7/521* (2017.01);
(Continued)

(58) Field of Classification Search
CPC .......... G02B 27/017; G02B 2027/0138; G02B 2027/014; G06K 9/00664; G06K 9/2027; G06K 2209/401; G06T 7/521; G06T 2207/10048; G06T 2207/10028; G01S 7/497; G01S 7/4876; G01S 17/89;
(Continued)

(56) References Cited

U.S. PATENT DOCUMENTS

| | | | | |
|---|---|---|---|---|
| 4,042,787 A | * | 8/1977 | Richards | H04Q 1/457 341/54 |
| 4,644,329 A | * | 2/1987 | Brueske | E04G 21/3285 340/556 |

(Continued)

FOREIGN PATENT DOCUMENTS

| | | |
|---|---|---|
| EP | 2594959 A1 | 5/2013 |
| WO | 2015107529 A1 | 7/2015 |

OTHER PUBLICATIONS

Xuan, et al., "Illumination, Phase Step Optimization and Improvements in Simultaneous Multiple Frequency Measurement for Time-of-Flight Sensors", In Proceedings of International Conference on 3D Imaging, Dec. 14, 2015, 6 pages.
(Continued)

*Primary Examiner* — Philip P. Dang
(74) *Attorney, Agent, or Firm* — Alleman Hall Creasman & Tuttle LLP

(57) ABSTRACT

An illumination source is operated to illuminate an operating environment and an optical sensor is periodically operated for a detection period to detect illumination reflected from one or more subjects within the operating environment. Upon recognizing a source of interfering pulsed illumination within the operating environment, the timing of a subsequent detection period may be varied. In this way, sensing of the interfering pulsed illumination may be averted.

20 Claims, 6 Drawing Sheets

(51) Int. Cl.

| | | |
|---|---|---|
| *G02B 27/01* | (2006.01) | |
| *G06K 9/20* | (2006.01) | |
| *G01S 17/10* | (2020.01) | |
| *G06T 7/521* | (2017.01) | |
| *G01S 7/487* | (2006.01) | |
| *G01S 7/497* | (2006.01) | |
| *G01S 17/88* | (2006.01) | |
| *G01S 17/89* | (2020.01) | |
| *G06K 9/00* | (2006.01) | |
| *G01S 17/48* | (2006.01) | |
| *G01S 17/86* | (2020.01) | |

(52) U.S. Cl.
CPC ............ *G01S 17/48* (2013.01); *G01S 17/86* (2020.01); *G02B 2027/014* (2013.01); *G02B 2027/0138* (2013.01); *G06K 2209/401* (2013.01); *G06T 2207/10028* (2013.01); *G06T 2207/10048* (2013.01)

(58) Field of Classification Search
CPC ........ G01S 17/10; G01S 17/88; G01S 17/023; G01S 17/48
See application file for complete search history.

(56) References Cited

U.S. PATENT DOCUMENTS

| | | | | |
|---|---|---|---|---|
| 5,104,222 | A * | 4/1992 | Kersey | G01D 5/35303 356/477 |
| 6,340,868 | B1 * | 1/2002 | Lys | A61N 5/0616 315/185 S |
| 6,577,080 | B2 * | 6/2003 | Lys | H05B 33/0803 315/292 |
| 6,774,367 | B2 * | 8/2004 | Stephan | B60Q 1/14 250/214 VT |
| 6,966,681 | B2 * | 11/2005 | Stephan | G01S 17/107 250/214 R |
| 7,132,804 | B2 * | 11/2006 | Lys | H05B 33/0803 315/292 |
| 7,164,117 | B2 * | 1/2007 | Breed | B60R 21/01516 250/208.1 |
| 7,221,104 | B2 * | 5/2007 | Lys | A61N 5/0616 315/291 |
| 7,308,296 | B2 * | 12/2007 | Lys | A61N 5/0616 600/407 |
| 7,352,339 | B2 * | 4/2008 | Morgan | F24C 7/004 340/815.68 |
| 7,379,390 | B2 | 5/2008 | McFarland | |
| 7,405,812 | B1 | 7/2008 | Bamji | |
| 7,415,126 | B2 * | 8/2008 | Breed | B60J 10/00 382/100 |
| 7,525,254 | B2 * | 4/2009 | Lys | B60Q 1/2696 307/10.8 |
| 7,598,686 | B2 * | 10/2009 | Lys | H05B 33/0815 315/292 |
| 8,495,732 | B2 * | 7/2013 | Guenthner | G06F 21/34 713/183 |
| 8,628,940 | B2 * | 1/2014 | Sorenson | C12N 9/1252 435/91.2 |
| 8,648,998 | B2 * | 2/2014 | Van Nieuwenhove | G01S 17/08 356/4.01 |
| 9,077,912 | B2 * | 7/2015 | Gong | H04N 5/247 |
| 9,477,307 | B2 * | 10/2016 | Chizeck | G06F 3/016 |
| 2004/0189796 | A1 * | 9/2004 | Ho | H04N 13/261 348/51 |
| 2008/0285496 | A1 * | 11/2008 | Fuchs | H04L 67/04 370/311 |
| 2012/0033045 | A1 | 2/2012 | Schweizer et al. | |
| 2012/0057620 | A1 * | 3/2012 | Yamamoto | H04W 48/10 375/211 |
| 2014/0152974 | A1 | 6/2014 | Ko | |
| 2014/0152975 | A1 | 6/2014 | Ko | |
| 2014/0313376 | A1 | 10/2014 | Van Nieuwenhove et al. | |
| 2015/0097928 | A1 | 4/2015 | Junuzovic et al. | |
| 2015/0318799 | A1 * | 11/2015 | Hirokubo | G05B 11/14 359/584 |
| 2016/0005179 | A1 | 1/2016 | Petyushko et al. | |
| 2016/0247314 | A1 * | 8/2016 | Park | G06T 15/60 |

OTHER PUBLICATIONS

Antonio Castañeda Zeman, Víctor, "Constructive interference for Multi-view Time-of-Flight acquisition", In Phd Thesis of Doctors of science, Mar. 9, 2016, 155 pages.

Wirnitzer, Bernhard, "Interference Cancelation in Ultrasonic Sensor Arrays by Stochastic Coding and Adaptive Filtering", In Proceedings of IEEE International Conference on Intelligent Vehicles, Oct. 23, 1998, pp. 376-380.

* cited by examiner

INTERFERENCE MITIGATION VIA ADAPTIVE DEPTH IMAGING

BACKGROUND

Depth cameras may be used to generate three dimensional representations of environments and objects in those environments. Such depth imaging devices may operate by actively emitting illumination, such as pulsed or structured light, followed by sensing light returned to the camera in order to determine depth values for a given scene.

DETAILED DESCRIPTION

Figure 1:
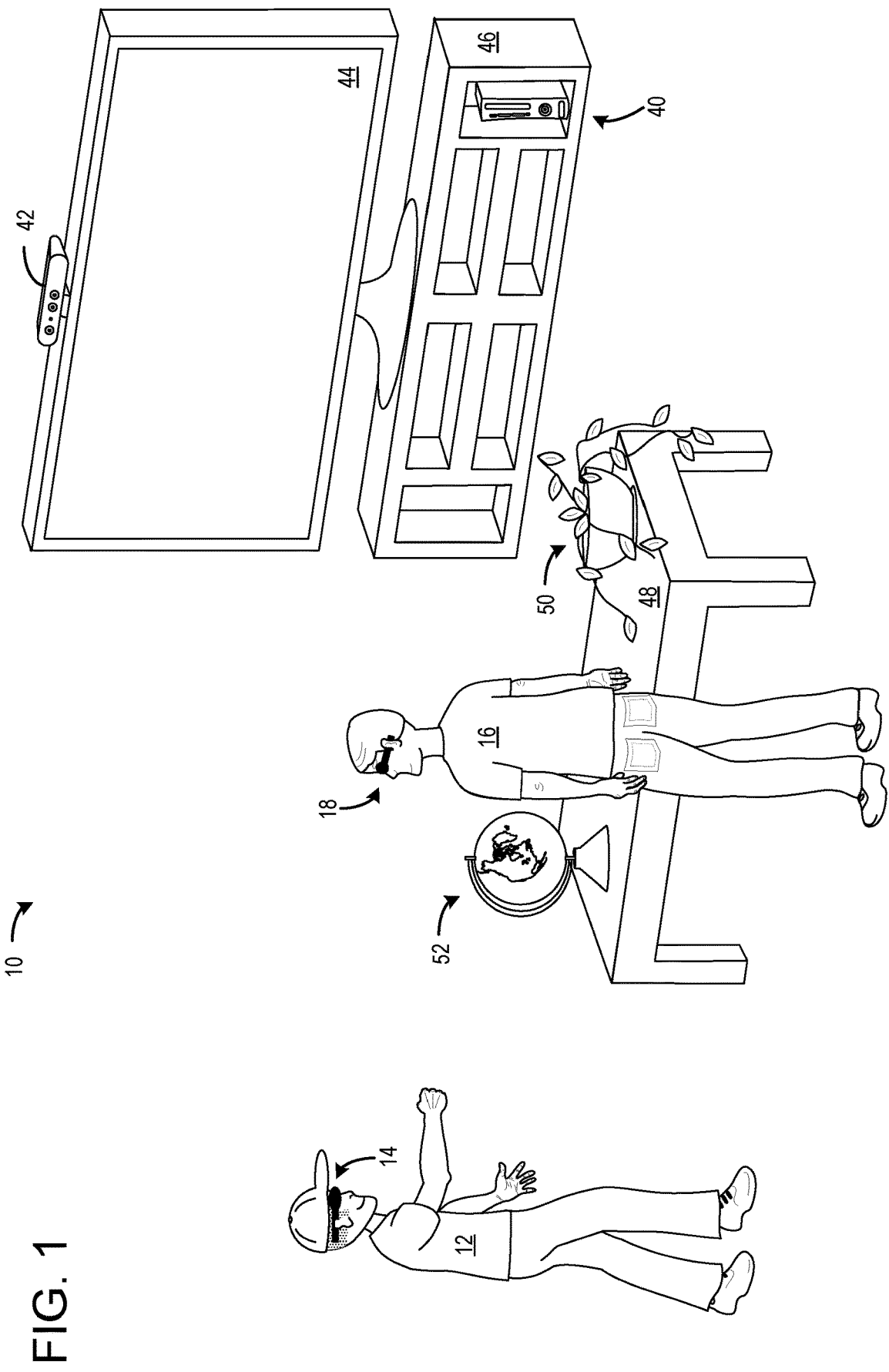
FIG. 1 shows a schematic perspective view of an environment including multiple depth imaging devices.

Active imaging depth cameras may operate by actively emitting light to illuminate an environment and sensing the reflected light in order to calculate depth values for the environment. Such depth imaging devices can be utilized in a variety of sensing applications including, but not limited to, spatial awareness, gesture recognition, scene mapping, and object capture. Depth imaging devices may be incorporated into home entertainment consoles, personal computers, head-mounted computing devices, medical imaging systems, driver assistance systems, autonomous vehicles, etc.

Depth imaging device types include pulsed and gated time of flight (ToF) cameras and structured light cameras. Both types output coded light into an operating environment, either as a pulse of light (ToF cameras) or as a dot pattern (structured light), respectively. A portion of the output light is reflected off of subjects within the operating environment back towards the camera where it is captured. The captured light is then processed and analyzed to extract depth information.

Light that is invisible to the user, such as infrared (IR) or near-IR light, is commonly used for the output light of depth imaging devices. Many depth imaging devices thus emit light with similar, if not identical spectral characteristics and are tuned to receive and analyze light with these spectral characteristics. If multiple depth imaging devices with similar spectral characteristics are active within a single operating environment, light emitted by one device may be received by all of the devices within the environment. Active illumination emitted from one device can interfere with the operation or performance of the optical sensors of nearby devices. As such, when multiple depth imaging devices are actively illuminating a single operating environment, there is a high likelihood of cross-device interference that may impact the accuracy of the resulting depth maps generated by each imaging device.

There are numerous scenarios where multiple different depth imaging devices could be actively operating in close proximity. For instance, active camera interference can occur if multiple users of head-mounted computing devices are each performing gestures within a single room. The occurrence of multiple drones or 3D ranging cameras scanning a similar space or multiple individuals scanning an object for digital reconstruction may also result in a scenario where nearby devices interfere with each other's performance. Virtual teleconferencing may require depth maps from multiple devices operating to simultaneously scan a room. Autonomous vehicle operations may rely on depth imaging devices to perform spatial recognition and awareness routines. If multiple autonomous vehicles enter the same intersection, they may experience interference and data corruption.

In many examples, the exposure and read times for pulse-type depth cameras represent a small fraction of the time allotment for capturing a single depth map frame. For example, a ToF camera may utilize a 200 μs illumination time and a 200 μs detection time (e.g., shatter open time). If recording at 60 frames per second (fps), the illumination and capture times could be significantly increased (e.g. 1-2 ms) while still comprising a relatively small portion of the frame allotment time of 16 msec per frame. As such, the portion of the frame allotment time that is not utilized for illumination or capture allows for temporal space in which multiple depth imaging devices may operate concurrently within a single operating environment without cross-interference.

FIG. 1 shows an example operating environment 10 in which two or more depth imaging devices may be used concurrently. For example, a first user 12 is shown wearing a head-mounted display device 14, and a second user 16 is shown wearing a head-mounted display device 18. Head-mounted display devices 14 and 18 may be identical devices, similar devices (e.g., different models of a product line), or unique devices. Head-mounted display devices 14 and 18 may include one or more sensor subsystems integrated into the head-mounted display device or communicatively coupled to the head-mounted display device. Such sensor systems may include one or more forward-facing imaging devices. Including one or more depth imaging devices. Head-mounted display devices 14 and 18 may further include one or more output devices, such as see-through display(s) for presenting display data as an augmentation to a real-world environment viewable through the see-through display(s) and speakers) for outputting audio data.

Figure 2:
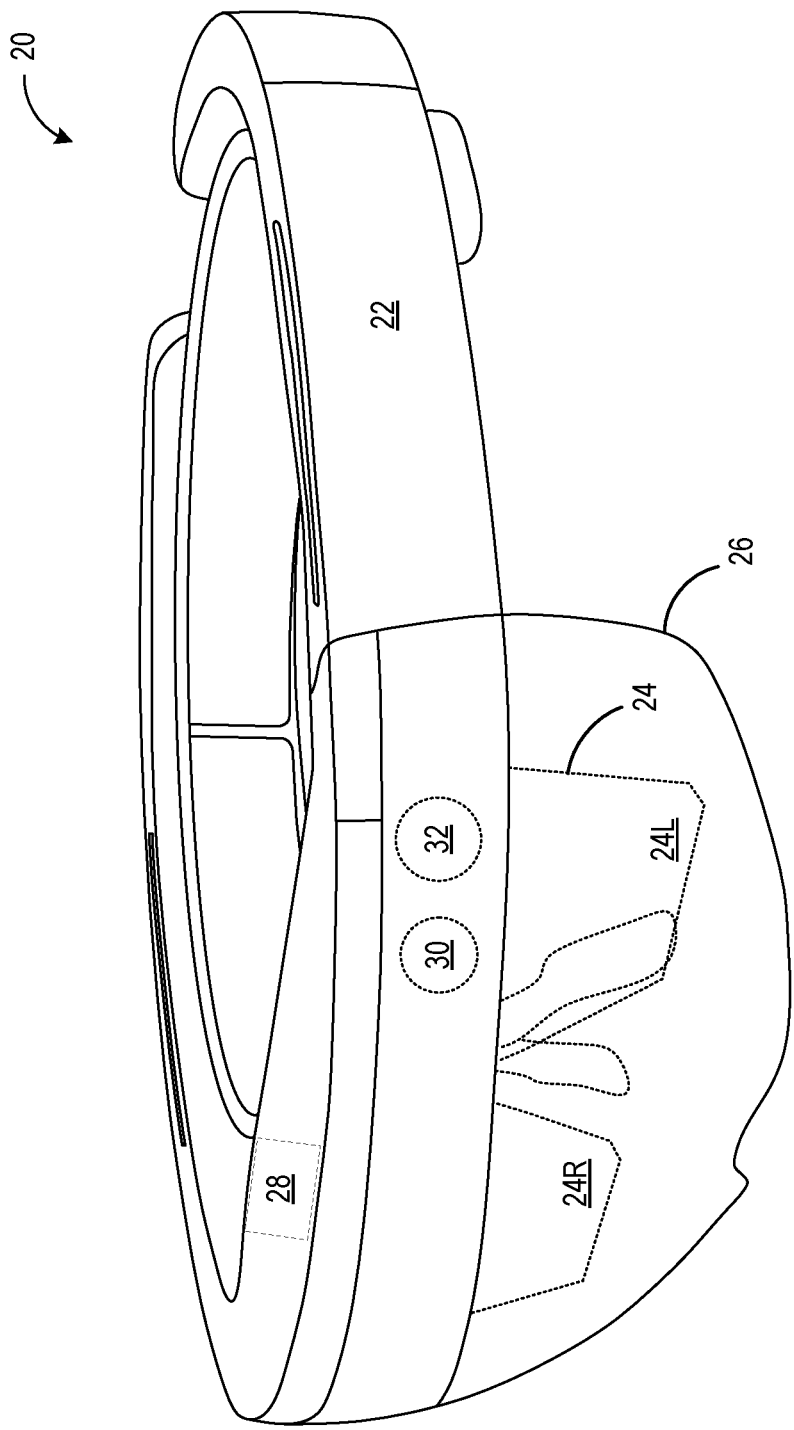
FIG. 2 shows a schematic view of a head-mounted display device according to an example of the present disclosure.

FIG. 2 schematically illustrates an example head-mounted display device 20. Head-mounted display device 20 may be an example of head-mounted display devices 14 and 18. The head-mounted display device 20 includes a frame 22 in the form of a band wearable around a head of is user that supports see through display componentry positioned nearby the user's eyes. Head-mounted display device 20 may utilize augmented reality technologies to enable simultaneous viewing of virtual display imagery and a real world background. As such, the head-mounted display device 20 may generate virtual images via see-through display 24, which includes separate right and left eye displays 24R and 24L, and which may be wholly or partially transparent. The see-through display 24 may take any suitable form, such as a waveguide or prism configured to receive a generated image and direct the image towards a wearer's eye. The see-through display 24 may include a backlight and a microdisplay, such as liquid-crystal display (LCD) or liquid crystal on silicon (LCOS) display, in combination with one or more light-emitting diodes (LEDs), laser diodes, and/or other light sources. In other examples, the see-through display 24 may utilize quantum-dot display technologies, active-matrix organic LED (OLED) technology, and/or any other suitable display technologies. It will be understood that while shown in FIG. 2 as a flat display surface with left and right eye displays, the see-through display 24 may be a single display, may be curved, or may take any other suitable form.

The head-mounted display device 20 further includes an additional see-through optical component 26, shown in FIG. 2 in the form of a see-through veil positioned between the see-through display 24 and the real world environment as viewed by a wearer. A controller 28 is operatively coupled to the see-through optical component 26 and to other display componentry. The controller 28 includes one or more logic devices and one or more computer memory devices storing instructions executable by the logic device(s) to enact functionalities of the head-mounted display device 20. The head-mounted display device 20 may further include various other components, for example a two-dimensional image camera 30 (e.g. a visible light camera and/or infrared camera) and a depth imaging device 32, as well as other components that are not shown, including but not limited to speakers, microphones, accelerometers, gyroscopes, magnetometers, temperature sensors, touch sensors, biometric sensors, other image sensors, eye-gaze detection systems, energy-storage components (e.g. battery), a communication facility, a GPS receiver, etc.

Depth imaging device 32 may include an infrared light and a depth camera (also referred to as an infrared light camera) configured to acquire video of a scene including one or more human subjects. The video may include a time-resolved sequence of images of spatial resolution and frame rate suitable for the purposes set forth herein. The depth imaging device and/or a cooperating computing system (e.g., controller 28) may be configured to process the acquired video to identify one or more objects within the operating environment, one or more postures and/or gestures of the user wearing head-mounted display device 20, one or more postures and/or gestures of other users within the operating environment, etc.

The nature and number of cameras may differ in various depth imaging devices consistent with the scope of this disclosure. In general, one or more cameras may be configured to provide video from which a time-resolved sequence of three-dimensional depth maps is obtained via downstream processing. As used herein, the term "depth map" refers to an array of pixels registered to corresponding regions of an imaged scene, with a depth value of each pixel indicating the depth of the surface imaged by that pixel. "Depth" is defined as a coordinate parallel to the optical axis of the depth camera, which increases with increasing distance from the depth camera.

In some implementations, depth imaging device 32 may include right and left stereoscopic cameras. Time-resolved images from both cameras may be registered to each other and combined to yield depth-resolved video.

In some implementations, a "structured light" depth camera may be configured to project a structured infrared illumination having numerous, discrete features (e.g., lines or dots). A camera may be configured to image the structured illumination reflected from the scene. Based on the spacings between adjacent features in the various regions of the imaged scene, a depth map of the scene may be constructed.

In some implementations, a "time-of-flight" depth camera may include a light source configured to project a pulsed infrared illumination onto a scene. Two cameras may be configured to detect the pulsed illumination reflected from the scene. The cameras may include an electronic shutter synchronized to the pulsed illumination, but the integration times for the cameras may differ, such that a pixel-resolved time-of-flight of the pulsed illumination, from the light source to the scene and then to the cameras, is discernible from the relative amounts of light received in corresponding pixels of the two cameras.

Returning to FIG. 1, computing device 40 may include any suitable computing device, including but not limited to a video game console, a home entertainment device (e.g., an audio/video receiver), a personal computing device, a laptop, a smart phone, a tablet computing device, and/or any other suitable computing system.

Computing device 40 may be communicatively coupled to sensor system 42 and display device 44. Sensor system 42 may include one or more of a visible light camera, an infrared camera, and/or a visible/infrared light projector for capturing RGB image data/frames and/or depth map data/frames. In some examples, one or more cameras of sensor system 42 may be eye-tracking cameras configured to capture images of a user's eye for determining a gaze target of the user. Sensor system 42 may additionally or alternatively include one or more directional microphones for receiving sound (e.g., from operating environment 10).

Head-mounted display devices 14 and 18 may be communicatively coupled to each other and/or to computing device 40. Both head-mounted display devices 14 and 18, as well as sensor system 42, may be operated to acquire depth data from operating environment 10 and subjects located therewithin, such as users 12 and 16 as well as objects such as entertainment center 46, table 48, potted plant 50, and globe 52.

In scenarios where two or more depth imaging devices are concurrently collecting depth data from within operating environment 10, there exists the potential for interference which may negatively impact the quality and/or validity of the acquired depth maps. IR light emitted by one device may be detected by other devices within the operating environment, saturating pixels or otherwise obscuring depth values. The likelihood of such interference increases as the number of depth imaging devices within an operating environment increases. Further, the likelihood of such interference may increase as frame rates for the depth imaging devices increase.

Figure 3:
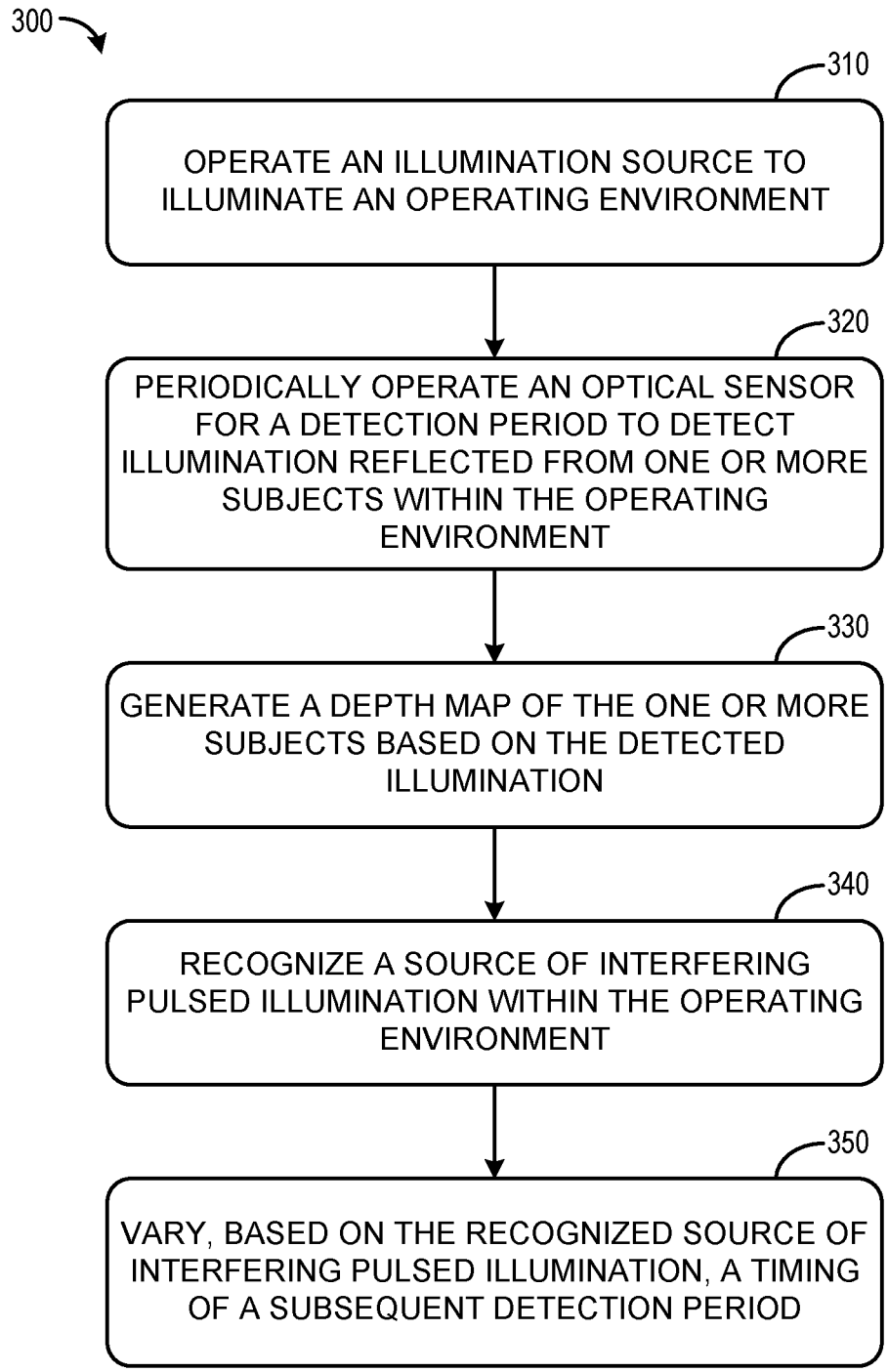
FIG. 3 shows a flowchart of an example method for adjusting depth camera operations based on detecting interfering illumination.

FIG. 3 shows a flowchart for an example method 300 for adjusting depth imaging device operations based on detecting interfering illumination in accordance with an example of the present disclosure. Method 300 enables a depth imaging device to vary the timing of frame capture in response to detecting an interfering device within the same operating environment. This allows the depth imaging device to avoid capturing interfering light, thus reducing the occurrence of corruption in subsequently generated depth maps.

At 310, method 300 includes operating an illumination source to illuminate an operating environment. As described above, this may include emitting a pulsed beam of light, a dot pattern of light, etc., and may further include emitting invisible light, such as IR or near-IR light. In some examples, this may include periodically operating the illumination source to illuminate the operating environment. For example, the illumination source may emit light for an illumination period. As an example, the depth imaging device may operate at a predetermined frame capture rate, and the illumination source may emit light for a duration equal to the illumination period once during the allotment time tor each frame. The frame capture rate, and thus the periodicity of the operation of the illumination source may be adaptive, and thus the timing of the illumination periods may be variable over time. In some examples, the illumination source may continuously emit light.

At 320, method 300 includes periodically operating an optical sensor for a detection period to detect illumination reflected from one or more subjects within the operating environment. The optical sensor may be specifically configured to detect light at the wavelength emitted by the illumination source. In some examples, detecting illumination may include opening a shutter or aperture for the detection period and/or exposing the optical sensor for a frame exposure time. As per illuminating the operating environment, detecting illumination may include opening an aperture or otherwise capturing reflected light for a detection period once during the allotment time for each frame.

In some examples, each detection period may be associated with a specific illumination period. For example, each frame allotment time comprise a single illumination period and a single detection period. The illumination period and detection period for such a frame may be concurrent, may partially overlap, or may be sequential, wherein the detection period follows the illumination period. The relative timing and degree of overlap of the illumination period and detection period may be adjusted over time.

While method 300 includes "periodically operating an optical sensor", similar methods may include aperiodic operation of the optical sensor and/or illumination source. Operation of the optical sensor and/or illumination source may be adaptively adjusted over time. For example, the illumination period and/or detection period may be increased or decreased over time, and may be increased or decreased relative to the frame capture rate. The frame capture rate may also be increased or decreased over time. In some examples, the frame capture rate may be adaptively adjusted based on detected illumination. For example, the frame capture rate may be increased or decreased based on detection of particular objects, patterns, movement, ambient conditions, etc. As an example, the frame capture rate may be increased based on the detection of a hand of a subject. The increase in frame rate may result in an increase in frequency of the illumination period and/or detection period.

At 330, method 300 includes generating a depth map of the one or more subjects based on the detected illumination. For example, the optical sensor may include an imaging array comprising a grid of photoreceptors. The imaging array may include phase-responsive photoreceptors and/or intensity-responsive photoreceptors tuned to be responsive to reflected light originating from the illumination source. A depth map may comprise a rectangular array of pixels ($X_i$, $Y_i$) with a depth value $Z_i$ associated with each pixel. The depth value for each pixel may be based on an intensity, phase, etc. of the detected reflected illumination, depending on the characteristics of the imaging array photoreceptors. In some variants, each pixel of a depth map may also have one or more associated brightness or color values—e.g., a brightness value for each of red, green, and blue light.

Continuing at 340, method 300 includes recognizing a source of interfering pulsed illumination within the operating environment. For example, recognizing a source of interfering pulsed illumination may include receiving a signal from a device comprising the source of interfering pulsed illumination. Such a signal may be an electronic signal which may be transmitted wirelessly between two devices, and/or may be transmitted via a third device. For example, referring to FIG. 1, head-mounted display devices 14 and 18 may transmit electronic signals between each other, and/or via computing device 20. In some examples, the received signal may comprise information regarding the timing of pulsed illumination, such as frame capture rate, illumination period duration, etc., and may additionally or alternatively comprise information regarding the properties of the pulsed illumination, such as wavelength, periodicity, structural pattern, etc.

In some examples, recognizing a source of interfering pulsed illumination may include receiving interfering pulsed illumination at a photodetector. Interfering pulsed illumination may be received with an optical device such as an ambient light sensor, fast photodetector, or high-speed camera. The photodetector receiving the interfering pulsed illumination may be separate from the optical sensor used to generate depth values for the depth imaging device.

The interfering pulsed illumination may be of a wavelength within a threshold of the wavelength of light output by the illumination source. For example, a photodetector of the depth imaging device may be tuned and/or sensitive to the same wavelength band emitted by the depth imaging device's illumination source and thus capable of detecting pulsed signals from adjacent systems. Receiving interfering pulsed illumination may include receiving interfering pulsed illumination with an intensity above a threshold. Pulsed illumination may be distinguished from ambient or background illumination based on pulsation duration and/or frequency within a range of durations and/or frequencies, etc. Receiving interfering pulsed illumination at a photodetector may thus further include indicating characteristics of the interfering pulsed illumination, such as pulsation duration, frequency, etc.

Additionally or alternatively, interfering pulsed light may be passively detected by evaluating one or more depth maps generated at the depth imaging device. Recognizing a source of interfering pulsed illumination may include recognizing invalidated pixels of the depth map. Pixels affected by interference may have a relatively high intensity reading, such as a saturated value, or an incorrect ratio value of the various shutter capture images associated with the depth calculation. Recognizing invalidated pixels of the depth map may include recognizing a number of invalidated pixels greater than a threshold, such as a threshold number of pixels that demonstrate total saturation. Invalid pixels may include pixels for which no depth is reported due to a corrupted input signal, IR contamination, etc.

In some examples, recognizing invalidated pixels of the depth map includes recognizing a predetermined pattern of invalidated pixels. Interference generated by a source of pulsed illumination may yield a different inherent pixel pattern than for other types of errors, such as multi-path errors. For example, the shape or orientation of invalidation may have discernible characteristics, such as increased correction in the vertical direction. A vertical shift is typical of device interference, while a strong IR signal corrupts full vertical lines within the depth map.

In some examples, a depth map may be compared to one or more previous depth maps. Based on the previous depth map(s), a specific set of signals may be expected in future depth maps. For example, clusters of neighboring pixels with similar depth values may be expected to display depth values within a threshold of each other in future depth maps, regardless of movement of the depth imaging device. Deviation from such an expected signal may take the form of noise, contamination, saturation, IR interference, etc. In the presence of IR interference (i.e., interfering pulsed illumination), the number of invalidations may be increased. In some examples, the number of invalid pixels within a depth map may be based on a ratio of returns (e.g., valid depth values). While ambient IR contamination may be sensed and subtracted out from the detected signal in generating depth maps, ambient IR contamination may be recognized as a source of interfering pulsed illumination if the ambient IR contamination is saturating, and specifically if the ambient IR contamination is pulsed.

Figure 4:
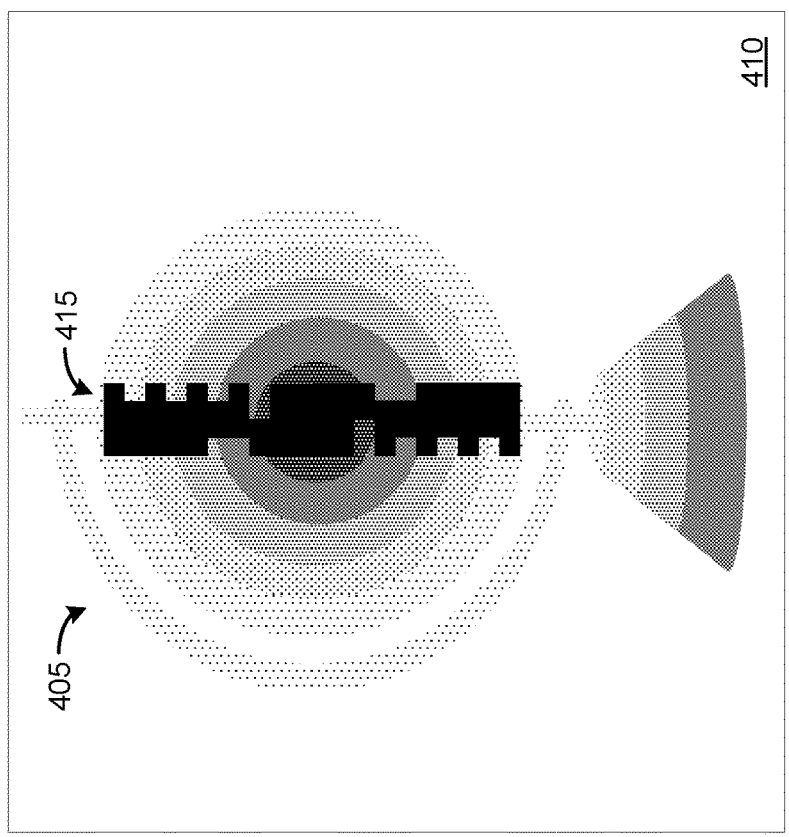
FIG. 4 depicts example depth maps taken with and without interfering illumination.
Figure 4:
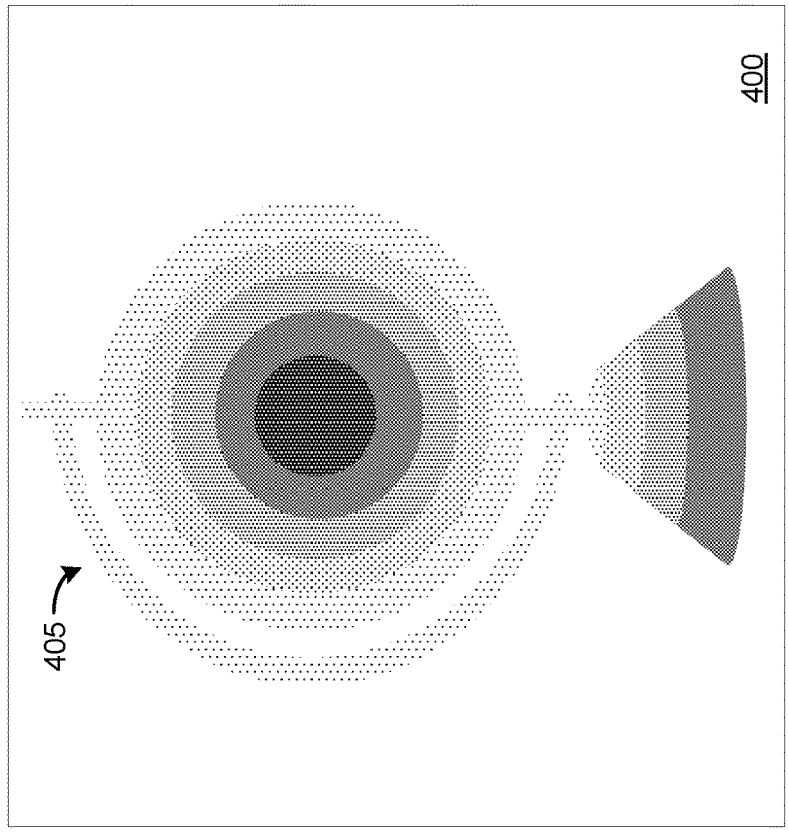

As an example, FIG. 4 schematically shows an initial depth map 400 of an object 405 (e.g., globe 52) within an operating environment taken in the absence of IR interference. Darker shaded regions (i.e., those with more dense dot patterns) represent portions of the object that are nearer to the depth imaging device, while lighter shaded regions (i.e., those with more sparse dot patterns) represent portions of the object that are further from the imaging device. Secondary depth map 410 shows an image of object 405 taken in the presence of IR interference. A subset of pixels 415, shown as solid black squares, demonstrate saturation. An evaluation of depth map 410 may thus indicate interfering pulsed light following an analysis.

The total number of pixels 415 demonstrating saturation may be compared to a threshold. In some examples, the pattern of saturation shown by pixels 415 may be determined to be representative of interference—in this example, due to the relatively vertical motif. In some examples, depth map 410 may be compared to depth map 400 and/or other previously captured depth maps, whereby the saturated pixels 415 may be evaluated against previous depth data for object 405. It may be determined that the depth values for pixels 415 are unlikely to be accurate values based on the depth values for surrounding pixels within depth map 410 and/or depth map 400.

Returning to FIG. 3, at 350, method 300 includes varying, based on the recognized source of interfering pulsed illumination, a timing of a subsequent detection period. As an example, varying a timing of a subsequent detection period may comprise introducing a first random delay period prior to a subsequent operation of the optical sensor. In examples where operating an illumination source to illuminate an operating environment comprises periodically operating the illumination source to illuminate the operating environment for an illumination period, the method may further comprise varying, based on the recognized source of interfering pulsed illumination, a timing of a subsequent illumination period. In other words, responsive to the detection of interfering pulsed illumination, a first random delay may be introduced prior to capturing a subsequent frame at the depth imaging device. In this way, the likelihood of depth map invalidation based on the interfering pulsed illumination may be reduced.

Varying a timing of subsequent illumination and/or detection periods may comprise introducing a first random delay period prior to a subsequent operation of the illumination source and/or optical sensor. However, introducing a first random delay may not include adjusting a frame capture rate of the imaging device. For a given frame capture rate, each frame may be captured within a frame allotment time. For example, for a depth imaging device operating at 60 fps, each frame is allotted 16.6 msecs of time. As described above, the illumination and detection periods may comprise a duration that is merely a fraction of such a frame allotment time. For example, each frame allotment time may include a 200 µs illumination period and a 200 µs detection period.

In an attempt to avoid detecting interfering pulsed illumination, the illumination and detection periods may be adjusted relative to the frame allotment time. In some examples, if the illumination source is operated continuously, the detection of interfering pulsed illumination may result in the operation the illumination source in a pulsed-mode.

Figure 5:
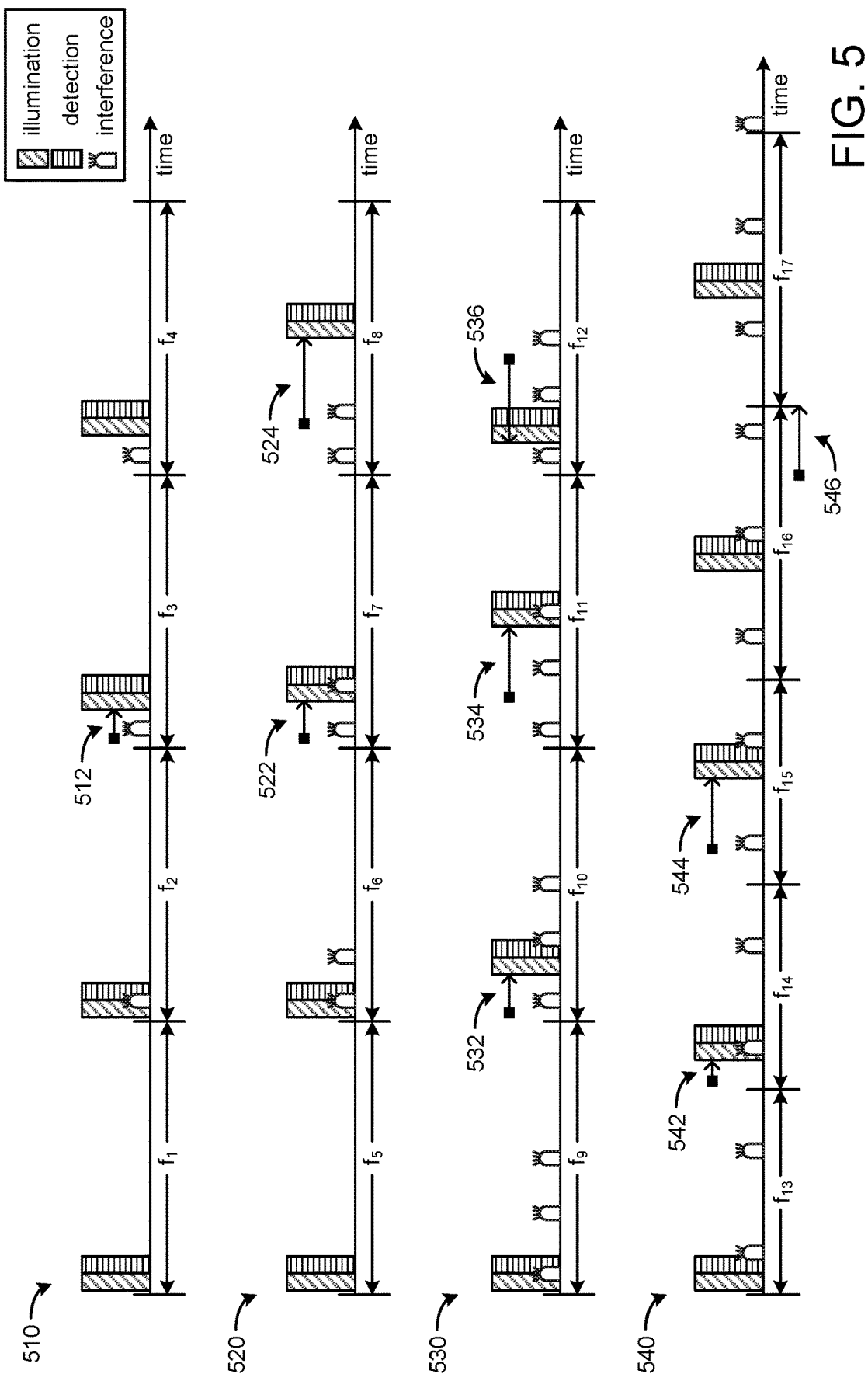
FIG. 5 shows an example timeline for adjusting depth imaging device operations based on detected interfering illumination.

As an example, FIG. 5 depicts example timelines for operation of a depth imaging device. In these examples, each frame ($f_x$) includes an illumination period and a subsequent detection period. A first timeline is shown at 510. During frame $f_1$, the illumination period and detection period occur near the beginning of the frame allotment time. No interfering illumination is detected. As such, during frame $f_2$, the timing of the illumination period and detection period is maintained relative to the frame allotment time. During frame $f_2$, interference is detected. As such, a random delay (512) is introduced prior to subsequent frame $f_3$. Both the illumination period and detection period are delayed with respect to the frame allotment period for frame $f_3$. As a result, no interference is detected during frame $f_3$. As such, no additional delay is introduced for subsequent frame $f_4$.

While introducing a random delay may increase the likelihood of avoiding interference, equally spaced frames may be necessary for complex functions that depend on depth, such as tracking of hands and complex gestures. As such, the random delay may be relatively short, such as less than 5 times the detection period. In some examples, the first random delay may be 2-3 times the detection period. In some examples, the first random delay may be less than 5 ms in duration. In some examples, additional information regarding the interfering pulsed illumination may be received and/or determined, such as pulsation frequency and/or duration. In such examples, a pseudo-random delay may be introduced, rather than a purely random delay. Such pseudo-random delays may be utilized in other scenarios, such as when more than two interfering devices are detected and/or when a dense pattern of IR contamination is determined from depth map analysis.

In some examples, following the introduction of a first random delay, interfering pulsed illumination may still be detected. In such examples, responsive to detecting interfering pulsed illumination during the subsequent detection period, introducing a second random delay period prior to further operation of the optical sensor, the second random delay period being longer in duration than the first random delay period. For example, the second random delay period may be on the order of between 3 and 10 times the duration of the detection period, and/or on the order of 5-15 msec. In other examples, the second random delay period may be equal to or shorter in duration than the first random delay period.

In FIG. 5, a second timeline is shown at 520. During frame $f_5$, the illumination period and detection period occur near the beginning of the frame allotment time. No interfering illumination is detected. As such, during frame $f_6$, the timing of the illumination period and detection period is maintained relative to the frame allotment time. During frame $f_6$, interference is detected. As such, a first random delay (522) is introduced prior to subsequent frame $f_7$. Both the illumination period and detection period are delayed with respect to the frame allotment period for frame $f_7$. Interference is again detected during frame $f_7$. As such, a second random delay (524) is introduced prior to subsequent frame $f_8$. The second random delay is longer in duration than the first random delay in this example. The second random delay allows frame $f_8$ to be captured without interference.

In examples where there are multiple devices, or where one or more sources of interfering pulsed illumination are continuously adjusting the timing of the illumination, more adaptive means of mitigating interference may be used in order to maintain a frame capture rate that is near to constant as possible. As an example, the timing of illumination and detection periods may be shifted back and forth across the frame allotment time.

Such an example is shown at 530 of FIG. 5. During frame $f_9$, the illumination period and detection period occur near the beginning of the frame allotment time, and interfering illumination is detected. As such, a first random delay (532) is introduced prior to subsequent frame $f_{10}$. Both the illumination period and detection period are delayed with respect to the frame allotment period for frame $f_{10}$. Interference is still detected during frame $f_{10}$. As such, a second random delay (534) is introduced prior to subsequent frame $f_{11}$, longer in duration than first random delay 532. Interference is still detected during frame $f_{11}$. In response to the continual detection of interference, the timing of illumination period and detection period are moved closer to the beginning of the frame allotment time for subsequent frame $f_{12}$. This timing shift (536) allows frame $f_{12}$ to be captured without interference.

In some examples a frame capture rate of the depth imaging device may be adjusted responsive to detecting interfering pulsed illumination during further operation of the optical sensor. The frame rate may be increased or decreased, and the adjusted frame rate may be selected in an effort to become out of phase from the sources of interfering pulsed illumination.

Such an example is shown at 540 of FIG. 5. During frame $f_{13}$, the illumination period and detection period occur near the beginning of the frame allotment time, and interfering illumination is detected. As such, a first random delay (542) is introduced prior to subsequent frame $f_{14}$. Both the illumination period and detection period are delayed with respect to the frame allotment period for frame $f_{14}$. Interference is still detected during frame $f_{14}$. As such, a second random delay (544) is introduced prior to subsequent frame $f_{15}$, longer in duration than first random delay 542. Interference is still detected during frame $f_{15}$. Accordingly, the frame allotment period for frame $f_{16}$ is elongated, as shown at 546. As the illumination period and detection period are maintained with respect to the beginning of the frame allotment period for frame $f_{16}$, interference is still detected. However, the extended frame allotment period allows the illumination period and detection period during frame $f_{17}$ to be shifted with regard to the period of the interfering pulsed illumination. As such, no interference is detected during frame $f_{17}$.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
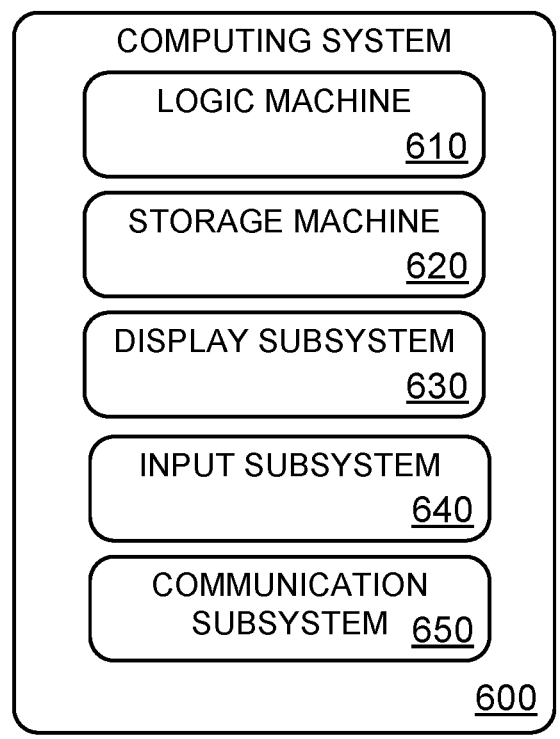
FIG. 6 shows a simplified schematic illustration of an example computing system that may be used in connection with the systems and methods described herein.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 610 and a storage machine 620. Computing system 600 may optionally include a display subsystem 630, input subsystem 640, communication subsystem 650, and/or other components not shown in FIG. 6.

Logic machine 610 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 620 includes one or more physical devices configured to hold instructions executable by the logic machine to implement the methods avid processes described herein. When such methods and processes are implemented, the state of storage machine 620 may be transformed—e.g., to hold different data.

Storage machine 620 may include removable and/or built-in devices. Storage machine 620 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 620 may include volatile, nonvolatile, dynamic, static, read/write, read-only, random/access, sequential-access, location-addressable, file-addressable, and/or content-addressable devices.

It will be appreciated that storage machine 620 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 610 and storage machine 620 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 610 executing instructions held by storage machine 620. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 630 may be used to present a visual representation of data held by storage machine 620. This visual representation may take the form of a graphical user interface (GUI). As the herein described methods and processes change the data held by the storage machine, and thus transform the state of the storage machine, the state of display subsystem 630 may likewise be transformed to visually represent changes in the underlying data. Display subsystem 630 may include one or more display devices utilizing virtually any type of technology. Such display devices may be combined with logic machine 610 and/or storage machine 620 in a shared enclosure, or such display devices may be peripheral display devices.

When included, input subsystem 640 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera, for machine vision and/or gesture recognition; a head tracker, eye tracker, accelerometer, and/or gyroscope for motion detection and/or intent recognition; as well as electric-field sensing componentry for assessing brain activity.

When included, communication subsystem 650 may be configured to communicatively couple computing system 600 with one or more other computing devices. Communication subsystem 650 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

As an example, a method for operating an imaging device is presented, comprising: operating an illumination source to illuminate an operating environment; periodically operating an optical sensor for a detection period to detect illumination reflected from one or more subjects within the operating environment; recognizing a source of interfering pulsed illumination within the operating environment; and varying, based on the recognized source of interfering pulsed illumination, a timing of a subsequent detection period. In such an example method, or any other method, recognizing a source of interfering pulsed illumination may additionally or alternatively comprise receiving a signal from a device comprising the source of interfering pulsed illumination. In any of the preceding example methods, or any other method, the received signal may additionally or alternatively comprise information regarding the timing of pulsed illumination. In any of the preceding example methods, or any other method, recognizing a source of interfering pulsed illumination may additionally or alternatively comprise receiving interfering pulsed illumination at a photodetector, the interfering pulsed illumination comprising a wavelength within a threshold of the wavelength of light output by the illumination source. In any of the preceding example methods, or any other method, the method may additionally or alternatively comprise generating a depth map of the one or more subjects based on the detected illumination, and recognizing a source of interfering pulsed illumination may additionally or alternatively include recognizing invalidated pixels of the depth map. In any of the preceding example methods, or any other method, recognizing invalidated pixels of the depth map may additionally or alternatively include recognizing a number of invalidated pixels greater than a threshold. In any of the preceding example methods, or any other method, recognizing invalidated pixels of the depth map may additionally or alternatively include recognizing a predetermined pattern of invalidated pixels. In any of the preceding example methods, or any other method, varying a timing of a subsequent detection period may additionally or alternatively comprise introducing a first random delay period prior to a subsequent operation of the optical sensor. In any of the preceding example methods, or any other method, introducing a first random delay may additionally or alternatively not include adjusting a frame capture rate of the imaging device. In any of the preceding example methods, or any other method, introducing a first random delay may additionally or alternatively include introducing a delay having a duration less than 5 times the detection period. In any of the preceding example methods, or any other method, the method may additionally or alternatively comprise: responsive to detecting interfering pulsed illumination during the subsequent detection period, introducing a second random delay period prior to further operation of the optical sensor, the second random delay period being longer in duration than the first random delay period. In any of the preceding example methods, or any other method, the method may additionally or alternatively comprise: responsive to detecting interfering pulsed illumination during further operation of the optical sensor, adjusting a frame capture rate of the imaging device. In any of the preceding example methods, or any other method, operating an illumination source to illuminate an operating environment may additionally or alternatively comprise periodically operating the illumination source to illuminate the operating environment for an illumination period, and wherein the method further comprises varying, based on the recognized source of interfering pulsed illumination, a timing of a subsequent illumination period.

In another example, a depth imaging device is presented, comprising: an illumination source; an optical sensor; a storage machine holding instructions executable by a logic machine to: periodically operate the illumination source to illuminate an operating environment for an illumination period; periodically operate the optical sensor for a detection period to detect illumination reflected from one or more subjects within the operating environment; generating a depth map of the one or more subjects based on the detected illumination; recognize a source of interfering pulsed illumination based on invalidated pixels of the depth map; and vary a timing of a subsequent illumination period and a subsequent detection period based on the recognized source of interfering pulsed illumination. In such an example depth imaging device, or any other depth imaging device, recognizing a source of interfering pulsed illumination based on invalidated pixels of the depth map may additionally or alternatively include recognizing a number of invalidated pixels greater than a threshold. In such an example depth imaging device, or any other depth imaging device, recognizing a source of interfering pulsed illumination based on invalidated pixels of the depth map may additionally or alternatively include recognizing a predetermined pattern of invalidated pixels. In such an example depth imaging device, or any other depth imaging device, recognizing a source of interfering pulsed illumination based on invalidated pixels of the depth map may additionally or alternatively include a comparison with previously generated depth maps.

In yet another example, a method for operating a depth camera is presented, comprising: determining a frame capture rate for generating depth maps of an environment; operating an illumination source to illuminate an operating environment for an illumination period during each frame allotment period; operating aa optical sensor for a detection period during each frame allotment period to detect illumination reflected from one or more subjects within the operating environment; recognizing a source of interfering pulsed illumination within the operating environment; and varying, based on the recognized source of interfering pulsed illumination, a timing of a subsequent illumination period and a subsequent detection period relative to a subsequent frame allotment period. In such an example method, or any other method, varying a timing of a subsequent illumination period and a subsequent detection period relative to a subsequent frame allotment period may additionally or alternatively include introducing a random delay to the timing of the subsequent illumination period and the subsequent detection period. In any of the preceding example methods, or any other method, delaying the timing of the subsequent illumination period and the subsequent detection period relative to the frame allotment period may additionally or alternatively not comprise adjusting the frame capture rate.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for operating an imaging device, comprising: operating an illumination source to illuminate an operating environment;
   periodically operating an optical sensor for a detection period to detect illumination reflected from one or more subjects within the operating environment;
   recognizing, via an evaluation of an input at the optical sensor, a source of interfering pulsed illumination within the operating environment, the recognized source of the interfering pulsed illumination controlled independently from the imaging device; and
   varying, based on the recognized source of the interfering pulsed illumination, a timing of a subsequent detection period by introducing a first random delay period prior to a subsequent operation of the optical sensor.

2. The method of claim 1, wherein recognizing, via the evaluation of the input at the optical sensor, the source of the interfering pulsed illumination includes receiving data from a device comprising the source of the interfering pulsed illumination.

3. The method of claim 2, wherein the received data comprises information regarding a timing of the interfering pulsed illumination.

4. The method of claim 1, wherein recognizing, via the evaluation of the input at the optical sensor, the source of the interfering pulsed illumination includes receiving the interfering pulsed illumination at a photodetector, the interfering pulsed illumination comprising a wavelength within a threshold of the wavelength of light output by the illumination source.

5. The method of claim 1, further comprising: generating a depth map of the one or more subjects based on the detected illumination, and wherein recognizing, via the evaluation of the input at the optical sensor, the source of the interfering pulsed illumination includes recognizing invalidated pixels of the depth map.

6. The method of claim 5, wherein recognizing the invalidated pixels of the depth map includes recognizing a number of invalidated pixels greater than a threshold.

7. The method of claim 6, wherein recognizing the invalidated pixels of the depth map includes recognizing a predetermined pattern of invalidated pixels.

8. The method of claim 1, wherein introducing the first random delay period does not include adjusting a frame capture rate of the imaging device.

9. The method of claim 1, wherein introducing the first random delay period includes introducing a delay having a duration less than 5 times the detection period.

10. The method of claim 1, further comprising: responsive to detecting the interfering pulsed illumination during the subsequent detection period, introducing a second random delay period prior to further operation of the optical sensor, the second random delay period being longer in duration than the first random delay period.

11. The method of claim 10, further comprising: responsive to detecting additional interfering pulsed illumination during further operation of the optical sensor, adjusting a frame capture rate of the imaging device.

12. The method of claim 1, wherein operating the illumination source to illuminate the operating environment comprises periodically operating the illumination source to illuminate the operating environment for an illumination period, and wherein the method further comprises varying, based on the recognized source of the interfering pulsed illumination, a timing of a subsequent illumination period.

13. A depth imaging device, comprising:
   an illumination source;
   an optical sensor;
   a storage machine holding instructions executable by a logic machine to:
   periodically operate the illumination source to illuminate an operating environment for an illumination period;
   periodically operate the optical sensor for a detection period to detect illumination reflected from one or more subjects within the operating environment;
   generating a depth map of the one or more subjects based on the detected illumination;
   recognize, via an evaluation of an input at the optical sensor, a source of interfering pulsed illumination based on invalidated pixels of the depth map, the recognized source of the interfering pulsed illumination controlled independently from the depth imaging device; and vary a timing of a subsequent illumination period and a subsequent detection period based on the recognized source of the interfering pulsed illumination by introducing a random delay to the timing of the subsequent illumination period and the subsequent detection period.

14. The depth imaging device of claim 13, wherein recognizing, via the evaluation of the input at the optical sensor, the source of the interfering pulsed illumination based on the invalidated pixels of the depth map includes recognizing a number of invalidated pixels greater than a threshold.

15. The depth imaging device of claim 13, wherein recognizing, via the evaluation of the input at the optical sensor, the source of the interfering pulsed illumination based on the invalidated pixels of the depth map includes recognizing a predetermined pattern of invalidated pixels.

16. The depth imaging device of claim 13, wherein recognizing, via the evaluation of the input at the optical sensor, the source of the interfering pulsed illumination based on the invalidated pixels of the depth map includes a comparison with previously generated depth maps.

17. A method for operating a depth camera, comprising:

determining a frame capture rate for generating depth maps of an environment;

operating an illumination source to illuminate an operating environment for an illumination period during each frame allotment period;

operating an optical sensor for a detection period during each frame allotment period to detect illumination reflected from one or more subjects within the operating environment;

recognizing, via an evaluation of input at the optical sensor, a source of interfering pulsed illumination within the operating environment, the recognized source of the interfering pulsed illumination controlled independently from the imaging device; and varying, based on the recognized source of interfering pulsed illumination, a timing of a subsequent illumination period and a subsequent detection period relative to a subsequent frame allotment period by introducing a random delay to the timing of the subsequent illumination period and the subsequent detection period.

18. The method of claim 17, wherein delaying the timing of the subsequent illumination period and the subsequent detection period relative to the frame allotment period does not comprise adjusting the frame capture rate.

19. The method of claim 5, wherein recognizing invalidated pixels of the depth map includes recognizing pixels that demonstrate a total saturation.

20. The method of claim 7, wherein recognizing the predetermined pattern of invalidated pixels includes recognizing an increased correction in a vertical direction of the depth map.

* * * * *